United States Patent
Abbondanzio et al.

(10) Patent No.: US 6,968,414 B2
(45) Date of Patent: Nov. 22, 2005

(54) MONITORING INSERTION/REMOVAL OF SERVER BLADES IN A DATA PROCESSING SYSTEM

(75) Inventors: Antonio Abbondanzio, Raleigh, NC (US); Gregory William Dake, Durham, NC (US); Gregory Brian Pruett, Raleigh, NC (US); David B. Rhoades, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 10/006,976

(22) Filed: Dec. 4, 2001

(65) Prior Publication Data

US 2003/0105904 A1 Jun. 5, 2003

(51) Int. Cl.⁷ ............................................. G06F 13/00
(52) U.S. Cl. ..................................... 710/301; 710/104
(58) Field of Search ............................... 710/104, 301, 710/302; 713/200; 361/726

(56) References Cited

U.S. PATENT DOCUMENTS

| | | | | |
|---|---|---|---|---|
| 4,481,625 A | * | 11/1984 | Roberts et al. | 370/464 |
| 5,437,019 A | * | 7/1995 | Brockmann | 711/5 |
| 5,765,008 A | * | 6/1998 | Desai et al. | 710/301 |
| 5,922,060 A | * | 7/1999 | Goodrum | 710/302 |
| 6,662,119 B1 | * | 12/2003 | Mitchell | 702/34 |
| 6,688,910 B1 | * | 2/2004 | Macauley | 439/491 |
| 6,792,515 B2 | * | 9/2004 | Smith | 711/153 |
| 2002/0124114 A1 | * | 9/2002 | Bottom et al. | 709/251 |
| 2002/0188709 A1 | * | 12/2002 | McGraw et al. | 709/223 |
| 2002/0194412 A1 | * | 12/2002 | Bottom | 710/302 |
| 2002/0198608 A1 | * | 12/2002 | Smith | 700/24 |
| 2003/0032335 A1 | * | 2/2003 | Garnett et al. | 439/638 |
| 2003/0033362 A1 | * | 2/2003 | King et al. | 709/203 |
| 2003/0033460 A1 | * | 2/2003 | King et al. | 710/100 |
| 2003/0070066 A1 | * | 4/2003 | Cross et al. | 713/100 |

* cited by examiner

Primary Examiner—Rehana Perveen
Assistant Examiner—Nimesh Patel
(74) Attorney, Agent, or Firm—Joseph P. Lally; Martin J. McKinley

(57) ABSTRACT

A system for monitoring server blades includes a cabinet having a plurality of racks configured to receive a server blade. The server blade includes one or more microprocessors, memory, and a service processor all interconnected via one or more busses. The system includes a management blade to monitor the local service processors. Upon installation, a new blade identifies itself to the management blade by its physical slot position within the cabinet. In response to a reset, the local blade service processor determines from a tamper latch whether the blade has been removed from the chassis since the last power-on event. If the tamper latch is broken, the local service processor informs the management blade and resets the tamper latch. The local service processor of each blade may send a periodic heartbeat to the management blade, which monitors for loss of the heartbeat signal to determine when a blade is removed.

15 Claims, 3 Drawing Sheets

ID
MONITORING INSERTION/REMOVAL OF SERVER BLADES IN A DATA PROCESSING SYSTEM

BACKGROUND

1. Field of the Present Invention

The present invention generally relates to the field of data processing systems and more particularly to a system and method for monitoring the insertion and removal of circuit boards or blades in a data processing system.

2. History of Related Art

Data processing systems in general and server-class systems in particular are frequently implemented with a server chassis or cabinet having a plurality of racks. Each cabinet rack can hold a rack mounted device (also referred to herein as a blade or server blade) on which one or more general purpose processors and/or memory devices are attached. The racks are vertically spaced within the cabinet according to an industry standard displacement (the "U"). Cabinets and racks are characterized in terms of this dimension such that, for example, a 42U cabinet is capable of receiving 42 1U rack-mounted devices, 21 2U devices, and so forth. Dense server designs are also becoming available, which allow a server chassis to be inserted into a cabinet rack, thus allowing greater densities than one server per 1U. To achieve these greater densities, the server chassis may provide shared components, such as power supplies, fans, or media access devices which can be shared among all of the blades in the server blade chassis.

In a rack-mounted server blade environment, the ability to hot plug server blades is a standard feature. Hot plugging refers to the ability to install and remove a blade without turning off power to the cabinet. When a new server blade is initially installed into a cabinet, the blade generally contains no operating system and no persistent data. Making a newly added blade functional requires deployment software that is capable of recognizing that a new blade has been added, determining the blade characteristics to uniquely identify the blade, powering the blade on, and assigning a functional boot image to the blade. For purposes of this disclosure, a boot image refers generally to software stored in persistent storage that is executed following a power-on or system reset event. The boot image may execute a self test (commonly referred to as a power on self test or POST), load a basic I/O system (BIOS) into memory, and install a functional operating system.

While the rack design beneficially facilitates the easy configuration and expansion of server systems, it also allows server blades to be moved about freely within a cabinet or between different cabinets. The mobility of rack-mounted server blades enabled by cabinet designs can increase the difficulty of monitoring the exact location of blades within a system or group of systems. It is desirable, nevertheless, to be able to determine the location of individual server blades within a system. It would be highly desirable, therefore, to implement a system and method that automates the tracking of server blades within the system. It would be further desirable if the implemented solution is able to determine when blades have been recently installed or removed from a particular rack. It would be still further desirable if the implemented solution did not substantially increase the cost or complexity of the system.

SUMMARY OF THE INVENTION

The problems identified above are in large part addressed by a system, method, and computer program product (software) for monitoring the location, insertion, and removal of server blades in a server system. The system would typically include a cabinet having a plurality of racks where at least one of the racks is configured to receive a server blade. Each server blade typically includes one or more general purpose microprocessors, a volatile system memory, and a service processor all interconnected via one or more busses. In addition, the server blade chassis would typically include a management blade that included a system service processor configured to monitor the local service processors attached to each server blade.

When a new blade is installed in a cabinet rack, the blade generates a signal to the system management blade identifying the new blade by its physical position in the cabinet and by the blade characteristics needed to uniquely identify and power the blade. These identifying characteristics may include unique identifiers for network interface cards on the blade, the blade model number, and the blade serial number. After determining that a new blade has been installed, the management blade may then configure a functional boot image on the blade and initiate an installation of an operating system.

The local service processor of each blade is automatically powered when a blade is installed into a cabinet (assuming the cabinet itself is powered). In response to a power-on or system reset event, the local service processor reads slot location and chassis identification information and determines from the state of a tamper latch whether the blade has been removed from the chassis since the last power-on event. If the tamper latch is broken, indicating that the blade was removed, the local service processor informs the management blade and resets the tamper latch. Using the information provided by the local service processors, the management blade is configured to maintain an up-to-date table of which blades are installed in which slots, and to send alerts with information about blade movements to higher-level system management software packages.

The local service processor of each blade may also send a periodic heartbeat message to the management blade. The management blade monitors for loss of the heartbeat signal from the various local blades. If a heartbeat is lost, the management blade detects a blade removal condition, logs the event, and takes appropriate action.

Alerts may be generated by the management processor for any detected blade insertion or removal. Alerts typically include the blade information obtained during the blade insertion notification, thereby providing a detailed description of a blade that was moved. Alerts are typically sent using standard alerting formats, enabling them to be received by existing systems management and deployment software. Software can then be configured to take automatic actions whenever a blade is inserted or removed.

BRIEF DESCRIPTION OF THE DRAWINGS

Other objects and advantages of the invention will become apparent upon reading the following detailed description and upon reference to the accompanying drawings in which.

Figure 1:
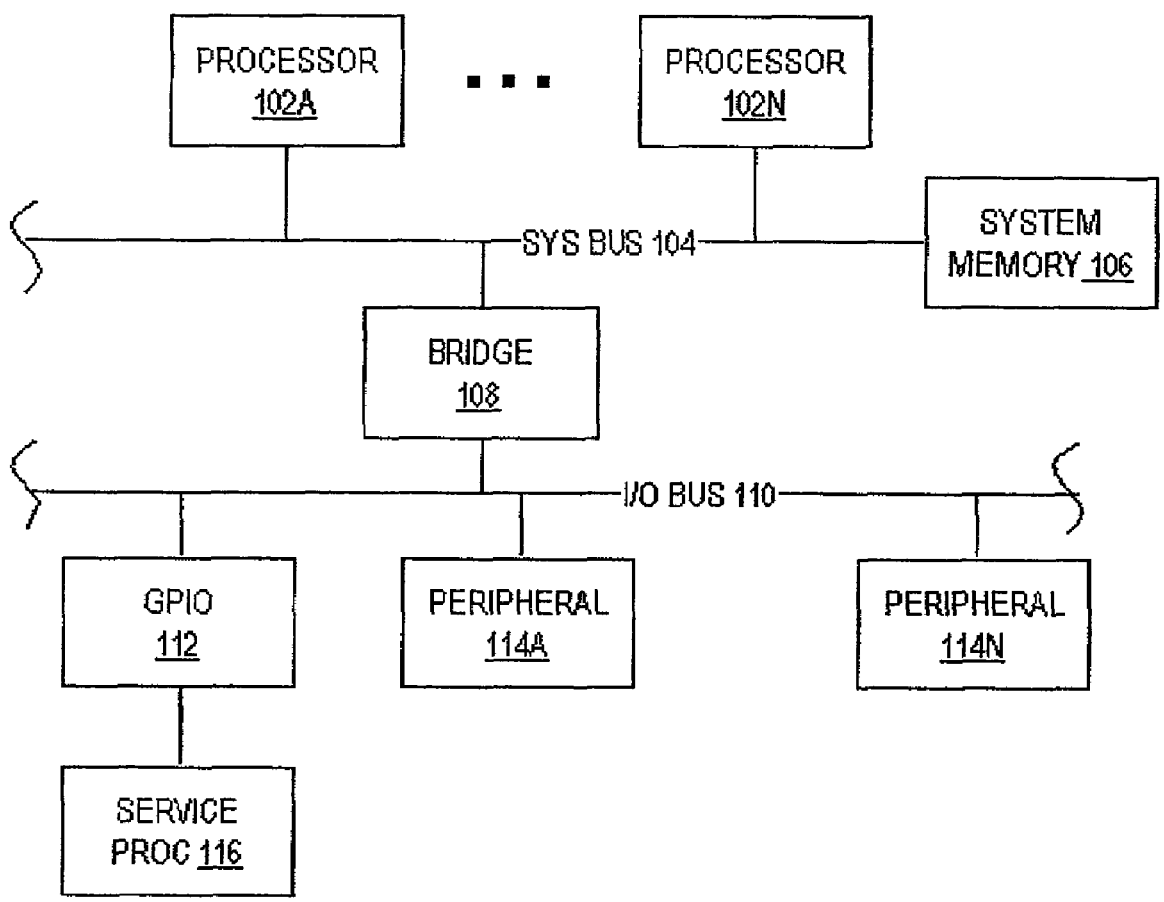
FIG. 1 is a block diagram of selected elements of a data processing system suitable for use with one embodiment of the present invention.
Figure 1:

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Turning now to the drawings, FIG. 1 is a block diagram of selected features of a data processing system 100 suitable for implementing the present invention. Data processing system 100 may be implemented entirely upon a single printed circuit board. In this embodiment, data processing system 100 may be alternatively referred to herein as server blade 100. In the depicted embodiment, server blade 100 includes a set of main processors 102A through 102N (generically or collectively referred to as processor(s) 102) that are connected to a system bus 104. A common system memory 106 is accessible to each processor 102 via system bus 104. The system memory is typically implemented with a volatile storage medium such as an array of dynamic random access memory (DRAM) devices. The depicted architecture of server blade 100 is frequently referred to as a symmetric multiprocessor (SMP) system because each processor 102 has substantially equal access to system memory 106.

In server blade 100, a bus bridge 108 provides an interface between system bus 104 and an I/O bus 110 to which one or more peripheral devices 114A through 114N (generically or collectively referred to as peripheral device(s) 114) as well as a general purpose I/O (GPIO) port are connected. Peripheral devices 114 may include devices such as a graphics adapter, a high-speed network adapter or network interface card (NIC), a hard-disk controller, and the like. I/O bus 110 is typically compliant with one of several industry standard I/O bus specifications including, as a common example, the Peripheral Components Interface (PCI) bus as specified in *PCI Local Bus Specification Rev* 2.2 by the PCI Special Interest Group (www.pcisig.com).

The depicted embodiment of server blade 100 includes a local service processor 116 connected to GPIO port 112. Local service processor 116 is configured to provide support for main processors 102. This support may include, for example, monitoring the power supplied to main processor(s) 102 and, in the event of a blade crash, initiating a restart of the main processors.

Figure 2:
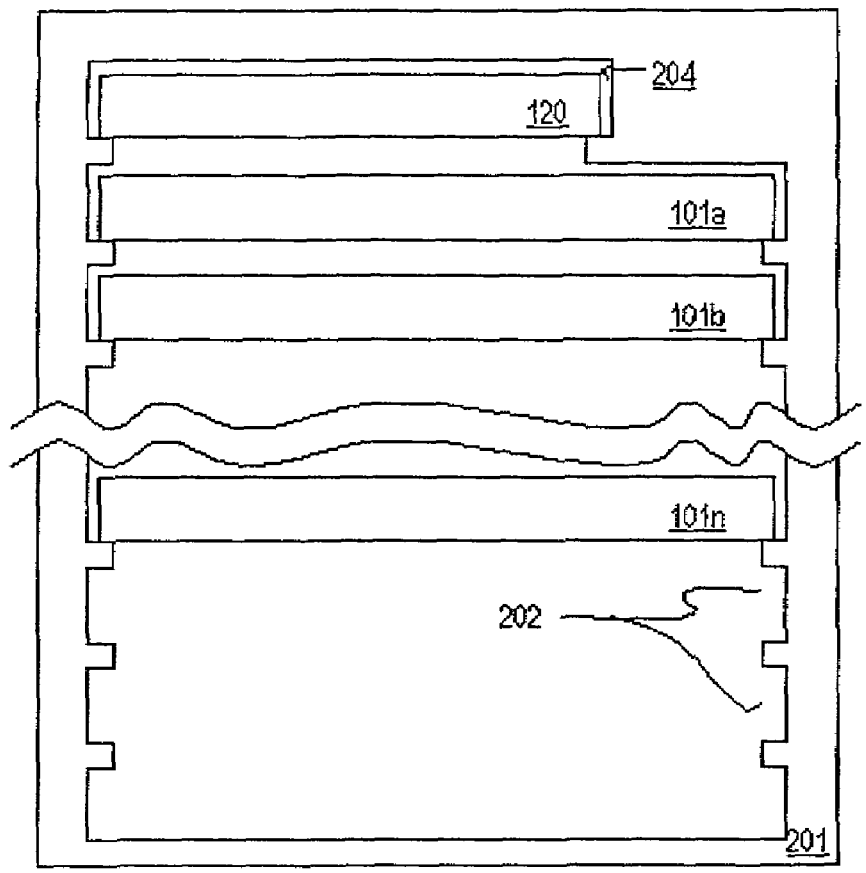
FIG. 2 depicts a data processing network according to one embodiment of the invention.

Turning now to FIG. 2, a data processing network 200 according to one implementation of the present invention is depicted. Data processing network 200 includes a rack enclosure or cabinet 201 that includes a plurality of slots or racks 202. Each rack 202 is configured to receive a rack mounted device such as a server blade chassis identified by reference numerals 101a through 101n (generically or collectively referred to as server blade chassis 101) via a suitable connection mechanism such as a traditional edge connector. Each server blade chassis 101 typically contains one or more server blades 100 as described with respect to FIG. 1. In one implementation, each server blade chassis 101 is a 4U component that may include as many as 16 server blades 100. Thus, the depicted embodiment of network 200 includes a set of server blade chassis 101, each of which includes one or more server blades 100. Each server blade 100 within server blade chassises 101a through 101n is typically connected to a local area network (LAN) through its NIC(s) such that server blades 100 in system 200 can communicate with each other. Network 200 may itself be connected to an external network such as the Internet through a gateway (not depicted) or other suitable network device.

As discussed with respect to FIG. 1, one embodiment of server blade 100 includes a local service processor 116 configured to monitor the blade's main processor(s) 102. Network 200 as depicted in FIG. 2 further includes a system management module 120 that is inserted into a slot 204 in cabinet 201. In the depicted embodiment, the dimension of management module 120 is different than the dimension of server blades 100 and management module slot 204 is sized to receive management module 120 while preventing inadvertent insertion of a server blade 100 into the slot.

Management module 120 is typically implemented with a management module service processor configured to monitor and control resources and characteristics of network 200 that are shared by each server blade 100. These resources and characteristics may include, for example, the power applied to cabinet 201, cabinet cooling fans, and environmental characteristics such as the ambient temperature within cabinet 201.

Portions of the present invention may be implemented as a sequence of processor executable instructions (software) for monitoring the insertion and removal of server blades in a data processing network where the instructions are stored on a computer readable medium. During execution, portions of the software may reside in a volatile storage element such as the system memory 106 depicted in FIG. 1 or an external or internal cache memory (not depicted) of main processor(s) 102. At other times, portions of the software may be stored on a non-volatile storage medium such as a floppy diskette, hard disk, CD ROM, DVD, magnetic tape, or other suitable storage medium. In addition, portions of the software may be executed by management module 120 while other portions are executed by local service processors 116 of each server blade 100.

Figure 3:
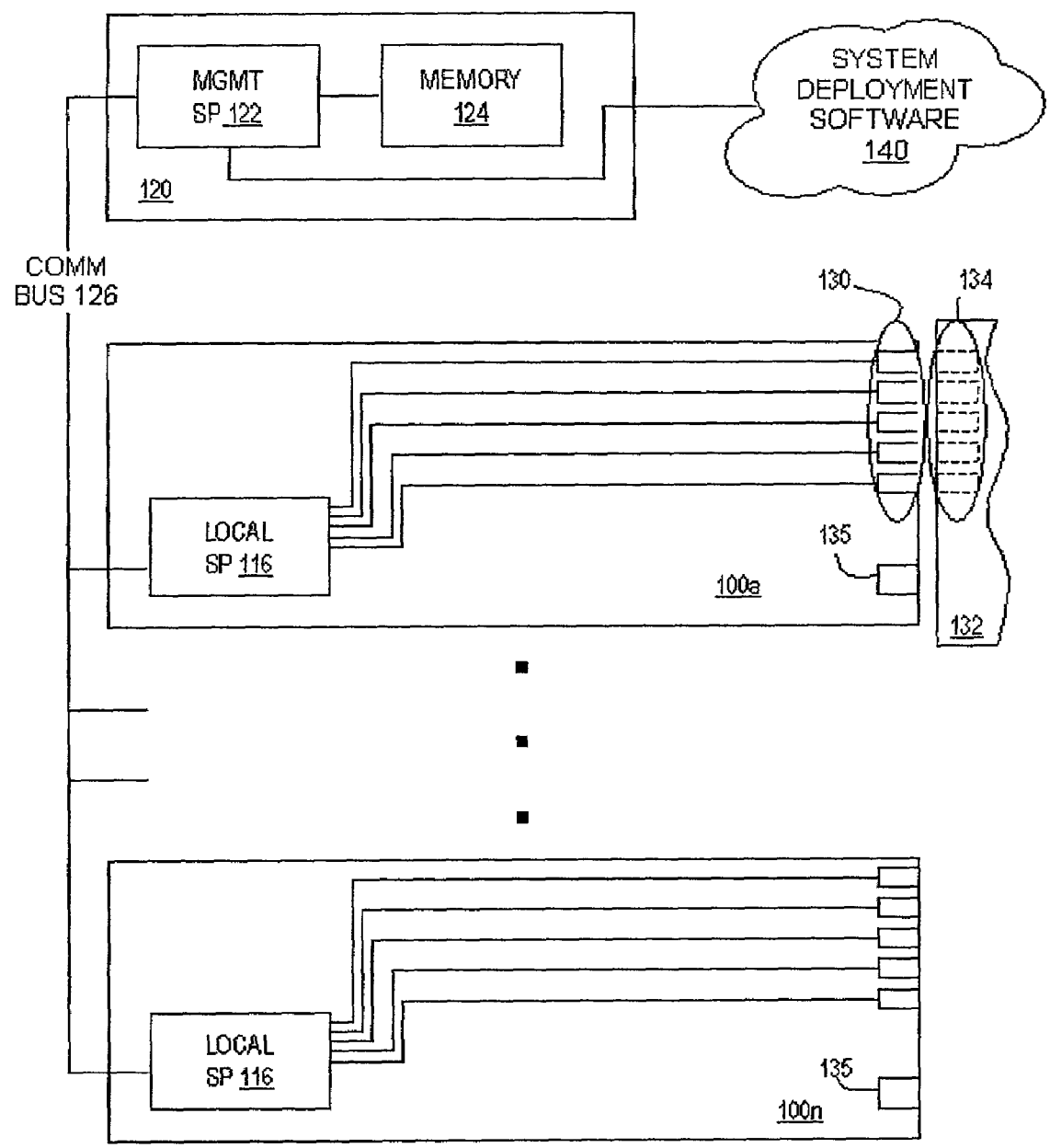
FIG. 3 illustrates additional detail of the data processing network of FIG. 2.

Turning now to FIG. 3, selected elements of data processing network 200 are depicted to emphasize the ability of network 200 to monitor the insertion and removal of server blades 100 to and from the network. In the depicted embodiment, management module 120 includes a management service processor 122 and a local memory 124 to which the management server processor has access. Management service processor 122 may be implemented with a general purpose microprocessor such as a "PowerPC" family microprocessor from IBM Corporation or an x86 family processor. Management module 120 is configured to communicate with system management and deployment software 140, which represents application specific code designed to provide system monitoring and control functionality to a system administrator. An example of system deployment software 140 is the IBM Director with Rapid Deployment Manager software from IBM Corporation.

Management module 120 is further configured to communicate information to and from each of the server blades 100 in network 200. Management module 120 may communicate with server blades 100 via a dedicated communication bus 126, which may be implemented according to a variety of industry standard or proprietary bus protocols. In one embodiment, the dedicated communication bus 126 is implemented as an RS-485 compliant bus. RS-485 is a differential voltage, serial communication bus protocol widely employed in the field of data acquisition. An RS-485 network can be connected in a 2-wire or 4-wire mode. The differential voltage transmission system enables a maximum cable length of as much as 4000 feet. RS-485 is well suited for connecting a management device to several addressable devices sharing the same cable. Additional details regarding the RS-485 bus are available from the Electronics Industry Association (EIA).

The local service processor 116 of each server blade 100 is connected to a set of physical identification (PID) connectors 130 that typically comprise a portion of the edge connectors of server blade 100. PID connectors 130 are configured to connect to a corresponding set of PID pins 134 of an edge connector 132 residing in each slot 202 of cabinet 201. The PID pins 134 of each connector 132 are uniquely wired to either ground or VDD to produce a binary value indicative of the physical position of the slot 202 in which the connector is positioned. The PID connectors 130 thus provide local processor 116 with means for determining the physical slot or geographical address occupied by the corresponding server blade 100.

In addition, each local service processor 116 is connected to communication bus 126 thereby enabling processor 116 to communicate information, such as the geographical address information, externally (i.e., beyond server blade 100). The ability to determine its geographical address automatically enables local service processor 116 to provide geographical address information to management module 120 and, in turn, to system management and deployment software 140.

Server blades 100 as depicted in FIG. 3 are further configured with a tamper latch 135. Tamper latch 135 comprises a mechanism that indicates whether a corresponding device or apparatus has been altered. In the case of server blades 100, tamper latch 135 may be configured to transition from a first state to a second state when the corresponding server blade is inserted into (or removed from) its slot. Tamper latch 135 may employ an impedance element that is electrically altered when the corresponding server blade 100 is removed from its slot. The impedance element preferably remains in this altered state until reset by system software. Thus, tamper latch 135 may include a persistent impedance element that changes impedance when its corresponding server blade 100 is inserted into or removed from its slot.

The local service processors 116 of server blades 100 are directly connected to system power connector pins of their server blades such that local service processors 116 are powered on whenever they are installed in their slots 202. In response to a power-up event (meaning a power-up of the local service processor), local service processors 116 immediately read their corresponding geographical address or slot location as well as chassis identification information (that is provided to them through separate connectors (not depicted)). In addition, a local service processor will read its corresponding tamper latch to determine if the blade has been removed since the last power up event. If the tamper latch is broken (in an impedance condition indicating that the blade has been removed), local service processor 116 sends an insertion notification to management module 120 and resets tamper latch 135.

When a server blade 100 is inserted into a vacant slot 202 of cabinet 201 thereby altering the state of tamper latch 135, the local service processor 116 sends an asynchronous alert to management module 120 via communication bus 126. The insertion alert typically identifies the new blade by its physical slot position or geographical address and by other characteristics desirable to uniquely identify and power on the blade, such as a NIC ID, a Universal Unique Identifier (UUID), and a processor and/or blade model number and serial number. Responsive to receiving an insertion alert from one of the server blades 100, management module 120 and external deployment software 140 may be configured to record the information contained in the alert and to determine, based upon this information, how to configure the blade (e.g., what boot image to load into the blade and so forth).

Local service processors 116 are typically configured to generate periodically a signal referred to herein as a heartbeat signal that is provided to management module via communication bus 126. Management module 120 is configured to maintain records of the currently inserted blades 120 and monitors for loss of heartbeat from the various blades. If a heartbeat is not detected for a predetermined length of time, management module detects a blade removal condition and responds accordingly. In one embodiment, of example, the blade removal condition is forwarded to management and deployment software 140.

When management module 120 detects either a blade insertion or blade removal, an alert is generated and forwarded to management and deployment software 140. The alerts may be formatted with the information obtained during the blade insertion notification thereby providing a detailed description of the blade that was moved. Alerts are sent using stand alerting formats, enabling them to be readily understood by systems management and deployment software 140. The software 140 can then be programmed to take automatic action, such as logging the insertion or removal, altering a graphical image of the system, initiating an automated deployment of an operating system, BIOS update, etc, onto the server blade, or other suitable action.

It will be apparent to those skilled in the art having the benefit of this disclosure that the present invention contemplates a system and method for monitoring resources used in a data processing network. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A data processing system, comprising:
   at least one main processor connected to a system bus;
   a system memory connected to the system bus and accessible to each of the main processors;
   a tamper mechanism configured to change state responsive to insertion of the system into a slot in a rack enclosure; and
   means for determining system information including geographical address information and for communicating the information externally
   wherein the means for determining the geographical address include a local service processor connected to a set of physical identification connector pins indicative of the geographical address of a slot in which the system is inserted.

2. The system of claim 1, wherein the means for communicating externally comprise a communication bus connected to the local service processor of the system.

3. The system of claim 2, wherein the communication bus comprises an RS-485 communication bus to which the local service processor is connected.

4. The system of claim 1, wherein, responsive to a power-on event, the local service processor of the system is configured to determine the system's geographical address, the state of the tamper mechanism, and to communicate the geographical address and tamper mechanism information externally.

5. The system of claim 4, wherein the system is configured, responsive to determining that the tamper mechanism is in an altered state, to configure a functional boot image on the system.

6. The system of claim 4, wherein, responsive to determining that the tamper mechanism is in an altered state, the service processor is configured to issue an external alert identifying the system by its geographical address.

7. The system of claim 6, wherein the external alert further identifies the system by system information selected from the list including an identifier of a network interface card of the system, a UUID, and a main processor serial number.

8. A data processing network, comprising:
   a management module comprising a management module service processor and a memory; and
   a plurality of sewer blades connected to a common network, each blade comprising a system memory connected to at least one main processor, a tamper mechanism configured to change state responsive to insertion of the corresponding blade into a slot in a rack enclosure, and means for determining a geographical address of the slot occupied by the blade and means for communicating the determined address to the management module;
   wherein the means for determining the geographical address include a local service processor connected to a set of physical identification connector pins indicative of the geographical address of the slot in which the system is inserted.

9. The network of claim 8, wherein the means for communicating comprise a communication bus connecting the local service processor of each server blade to the management module.

10. The network of claim 9, wherein the communication bus comprises an RS-485 communication bus to which each local service processor is connected.

11. The network of claim 8, wherein, responsive to a power-on event, the local service processor of each server blade is configured to determine the blade's geographical address, the state of the tamper mechanism, and to communicate the geographical address and tamper mechanism information to the management module.

12. The network of claim 11, wherein each server blade is configured, responsive to determining that its tamper mechanism is in an altered state, to configure a functional boot image on the server blade.

13. The network of claim 11, wherein, responsive to determining that the tamper mechanism is in an altered state, the service processor is configured to issue an external alert to the management identifying the system by its geographical address.

14. The network of claim 13, wherein the external alert further identifies the system by system information selected from the list including an identifier of a network interface card of the system, a UUID, and a main processor serial number.

15. The network of claim 14, wherein the management module is configured to communicate the system information to a system deployment module.

* * * * *

UNITED STATES PATENT AND TRADEMARK OFFICE
CERTIFICATE OF CORRECTION

| | | |
|---|---|---|
| PATENT NO. | : 6,968,414 B2 | Page 1 of 1 |
| APPLICATION NO. | : 10/006976 | |
| DATED | : November 22, 2005 | |
| INVENTOR(S) | : Antonio Abbondanzio et al. | |

It is certified that error appears in the above-identified patent and that said Letters Patent is hereby corrected as shown below:

Claim 8, Col. 7, Line 23, delete "sewer" and insert --server--

Signed and Sealed this

Twentieth Day of May, 2008

JON W. DUDAS
*Director of the United States Patent and Trademark Office*